United States Patent
Park et al.

(10) Patent No.: US 10,759,671 B2
(45) Date of Patent: Sep. 1, 2020

(54) METHOD FOR MANUFACTURING LITHIUM HYDROXIDE AND LITHIUM CARBONATE, AND DEVICE THEREFOR

(71) Applicant: RESEARCH INSTITUTE OF INDUSTRIAL SCIENCE & TECHNOLOGY, Pohang-si (KR)

(72) Inventors: Sung Kook Park, Pohang-si (KR); Kwang Seok Park, Pohang-si (KR); Sang Gil Lee, Pohang-si (KR); Woo Chul Jung, Pohang-si (KR); Ki Young Kim, Pohang-si (KR); Hyun Woo Lee, Pohang-si (KR)

(73) Assignee: RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 224 days.

(21) Appl. No.: 15/570,400

(22) PCT Filed: Apr. 29, 2016

(86) PCT No.: PCT/KR2016/004548
§ 371 (c)(1),
(2) Date: Oct. 30, 2017

(87) PCT Pub. No.: WO2016/175613
PCT Pub. Date: Nov. 3, 2016

(65) Prior Publication Data
US 2018/0148342 A1 May 31, 2018

(30) Foreign Application Priority Data

Apr. 30, 2015 (KR) .................. 10-2015-0061914
Jun. 8, 2015 (KR) .................. 10-2015-0080872

(51) Int. Cl.
*B01D 61/44* (2006.01)
*B01D 61/50* (2006.01)
(Continued)

(52) U.S. Cl.
CPC ............ *C01D 15/08* (2013.01); *B01D 53/46* (2013.01); *B01D 61/445* (2013.01); *B01D 61/50* (2013.01);
(Continued)

(58) Field of Classification Search
CPC .......... B01D 2311/25; B01D 2311/263; B01D 61/445; B01D 61/50; B01D 61/42;
(Continued)

(56) References Cited

U.S. PATENT DOCUMENTS

| 5,567,293 A * | 10/1996 | Paleologou ............ B01D 61/44 204/523 |
| 2011/0203929 A1* | 8/2011 | Buckley ............... B01D 61/445 204/537 |
| 2013/0146476 A1* | 6/2013 | Chon ........................ C25C 1/02 205/770 |

FOREIGN PATENT DOCUMENTS

| CN | 87106982 | 4/1988 |
| CN | 1878610 | 12/2006 |

(Continued)

OTHER PUBLICATIONS

EPO, Extended European Search Report of EP 16786799.3 dated Dec. 21, 2018.
(Continued)

*Primary Examiner* — Salil Jain
(74) *Attorney, Agent, or Firm* — Lex IP Meister, PLLC

(57) ABSTRACT

The present invention relates to a method for manufacturing lithium hydroxide and lithium carbonate, and a device
(Continued)

therefor. The present invention provides a method for manufacturing lithium hydroxide, comprising: a step of dissolving lithium phosphate in an acid; a step of preparing a monovalent ion selective-type electrodialysis device disposed in the order of a cathode cell containing a cathode separator, a monovalent anion selective-type dialysis membrane for selectively permeating a monovalent anion, a monovalent cation selective-type dialysis membrane for selectively permeating a monovalent cation, and an anode cell containing an anode separator, injecting the lithium phosphate dissolved in the acid between the anode separator of the anode cell and the monovalent cation selective-type dialysis membrane, and between the cathode separator of the cathode cell and the monovalent anion selective-type dialysis membrane, respectively, and injecting water between the monovalent cation selective-type dialysis membrane and the monovalent anion selective-type dialysis membrane; a step of obtaining an aqueous lithium chloride solution, and at the same time, obtaining a phosphoric acid aqueous solution formed as a byproduct, by applying an electric current to the monovalent ion selective-type electrodialysis device; and a step of converting the obtained aqueous lithium chloride solution into an aqueous lithium hydroxide solution.

20 Claims, 5 Drawing Sheets

(51) Int. Cl.
| | |
|---|---|
| *C01D 15/08* | (2006.01) |
| *C25B 1/20* | (2006.01) |
| *C01D 15/02* | (2006.01) |
| *C25B 1/14* | (2006.01) |
| *B01D 53/46* | (2006.01) |
| *C01D 15/04* | (2006.01) |

(52) U.S. Cl.
CPC ............. *C01D 15/02* (2013.01); *C01D 15/04* (2013.01); *C25B 1/14* (2013.01); *C25B 1/20* (2013.01); *B01D 2311/25* (2013.01); *B01D 2311/263* (2013.01); *C01P 2006/80* (2013.01); *Y02W 10/37* (2015.05)

(58) Field of Classification Search
CPC ...... B01D 61/422; B01D 61/44; B01D 61/46; B01D 61/52; B01D 61/54; C01D 15/02; C01D 15/04; C01D 15/08; C25B 1/14; C25B 1/20
See application file for complete search history.

(56) References Cited

FOREIGN PATENT DOCUMENTS

| | | | | |
|---|---|---|---|---|
| CN | 102036739 | | 4/2011 | |
| CN | 103114211 | | 5/2013 | |
| CN | 106379919 | | 2/2017 | |
| JP | 2009-269810 | | 11/2009 | |
| JP | 2012-504545 | | 2/2012 | |
| JP | 2012-214308 | | 11/2012 | |
| KR | 10-2012-0063069 | | 6/2012 | |
| KR | 10-2012-0089515 | | 8/2012 | |
| KR | 10-20120089515 | * | 8/2012 | ............ B01D 21/00 |
| KR | 10-2013-0092323 | | 8/2013 | |
| KR | 10-2014-0144379 | | 12/2014 | |
| RU | 2090503 | | 9/1997 | |
| RU | 2470878 | | 12/2012 | |
| WO | 88-02652 | | 4/1988 | |
| WO | 2013-159194 | | 10/2013 | |
| WO | 2016-161511 | | 10/2016 | |

OTHER PUBLICATIONS

Federal Service for Intellectual Property, Office Action of the corresponding Russian Patent Application No. 2017141578., dated Sep. 18, 2018.

Xue-jun Yang et al., "Preparation of stick microfine Lithii carbonate", Journal of Southwest University for Nationalities. Natural Science Edition, pp. 705-708, Jul. 2006.

* cited by examiner

US 10,759,671 B2

METHOD FOR MANUFACTURING LITHIUM HYDROXIDE AND LITHIUM CARBONATE, AND DEVICE THEREFOR

TECHNICAL FIELD

A method for manufacturing lithium hydroxide and lithium carbonate and an apparatus therefor are disclosed.

BACKGROUND ART

In order to economically manufacture lithium hydroxide and lithium carbonate having a purity of over the certain level concentration for a commercial view, a lithium concentration is required to be appropriately concentrated enough to be carbonated while removing impurities existed in a lithium-containing solution.

However, the costs for removing impurity and concentrating lithium cover most of the whole expenses causing a problem, so it has been researched to solve the problem.

First, a chemical precipitation is generally known as a method of removing impurities of ion moiety into less than or equal to the predetermined concentration. However, it causes a problem in that the chemical reagent costs for them are excessively demanded, and furthermore, the added chemical reagent becomes another impurity so to be purified again.

Meanwhile, a technique of evaporating natural brine using solar heat to remove impurities and to concentrate lithium has been suggested as a method of concentrating lithium. However, if depending upon a natural evaporation, it spends a long time for greater than or equal to 1 year, so a huge evaporation facility (ex., artificial pond for evaporation, etc.) is required to solve the time problem. In this case, a huge facility investment cost, an operation cost, a maintenance cost, and the like for this are additionally occurred.

Accordingly, in order to economically manufacture lithium hydroxide and lithium carbonate having a purity in greater than or equal to the predetermined concentration, a technique substituting the chemical precipitation and the natural evaporation is demanded, but effective alternatives have not suggested yet.

DISCLOSURE

Technical Problem

The present Inventors suggest an effective alternative of economically manufacturing lithium hydroxide and lithium carbonate according to other method except the chemical precipitation and the natural evaporation.

Specifically, they have developed a series of processes: dialyzing lithium phosphate using a monovalent ion selective-type electrodialysis device to be separated into an aqueous lithium chloride solution and an aqueous phosphoric acid solution; dialyzing the separated lithium chloride using a bipolar electrodialysis device to be separated into an aqueous lithium hydroxide solution and an aqueous hydrochloric acid solution, and finally obtaining powder phases of lithium hydroxide and lithium carbonate from the separated lithium hydroxide solution.

Herein, each of methods of manufacturing lithium hydroxide and lithium carbonate is suggested as an exemplary embodiment of the present invention.

Technical Solution

In one embodiment of the present invention, a method for manufacturing lithium hydroxide includes: a step of dissolving lithium phosphate in an acid; a step of preparing a monovalent ion selective-type electrodialysis device disposed in the order of a cathode cell containing a cathode separator, a monovalent anion selective-type dialysis membrane for selectively permeating a monovalent anion, a monovalent cation selective-type dialysis membrane for selectively permeating a monovalent cation, and an anode cell containing an anode separator, injecting the lithium phosphate dissolved in the acid between the anode separator of the anode cell and the monovalent cation selective-type dialysis membrane, and between the cathode separator of the cathode cell and the monovalent anion selective-type dialysis membrane, respectively, and injecting water between the monovalent cation selective-type dialysis membrane and the monovalent anion selective-type dialysis membrane;

a step of obtaining an aqueous lithium chloride solution, and at the same time, obtaining a phosphoric acid aqueous solution formed as a byproduct, by applying an electric current to the monovalent ion selective-type electrodialysis device; and a step of converting the obtained aqueous lithium chloride solution into an aqueous lithium hydroxide solution.

Hereinafter, the each step is described.

The step of converting the obtained aqueous lithium chloride solution into an aqueous lithium hydroxide solution may include a step of preparing a bipolar electrodialysis device disposed in the order of an anode cell containing an anode; a first bipolar membrane; an anion selective-type dialysis membrane; a cation selective-type dialysis membrane, a second bipolar membrane; and a cathode cell containing a cathode, injecting the aqueous lithium chloride solution between the cation selective-type dialysis membrane and the anion selective-type dialysis membrane, and injecting water between the first bipolar membrane and the anion selective-type dialysis membrane and between the second bipolar membrane and the cation selective-type dialysis membrane, respectively; and a step of obtaining an aqueous lithium hydroxide solution and at the same time, obtaining a aqueous hydrochloric acid solution formed as a byproduct by applying an electric current to the bipolar electrodialysis device.

The step of preparing the lithium phosphate may include a step of preparing a lithium-containing solution; and injecting a phosphorus supplying material to the lithium-containing solution to precipitate dissolved lithium as lithium phosphate.

The aqueous phosphoric acid solution obtained by the monovalent ion selective-type electrodialysis device may be used as a phosphorus supplying material in the step of injecting a phosphorus supplying material to the lithium-containing solution to precipitate dissolved lithium as lithium phosphate.

The aqueous hydrochloric acid solution obtained by the bipolar electrodialysis device may be used for a part or a whole of the acid in the step of dissolving the lithium phosphate in an acid.

After the step of obtaining an aqueous lithium hydroxide solution and at the same time, obtaining a aqueous hydrochloric acid solution formed as a byproduct by applying an electric current to the bipolar electrodialysis device, the method may further include a step of concentrating the aqueous lithium hydroxide solution to crystallize it; and a step of drying the crystallized lithium hydroxide to obtain lithium hydroxide in a powder form.

In the step of preparing a lithium-containing solution, the lithium-containing solution may be selected from a solution extracting lithium dissolved in the ocean, a solution generated in a process of recycling a wasted lithium battery, a lithium mineral-leaching solution, a brine, a lithium-containing hot spring water, a lithium-containing underground water, a lithium-containing bittern, and a combination thereof.

Before the step of injecting a phosphorus supplying material to the lithium-containing solution to precipitate dissolved lithium as lithium phosphate, the method may further include a step of removing a divalent ion impurity in the lithium-containing solution.

Specifically, the step of removing a divalent ion impurity in the lithium-containing solution may be a step of removing a calcium ion and a magnesium ion by injecting a compound selected from sodium hydroxide (NaOH), sodium carbonate ($Na_2CO_3$), calcium hydroxide ($Ca(OH)_2$), sodium sulfate ($Na_2SO_4$), and a combination thereof to the lithium-containing solution.

In the step of dissolving lithium phosphate in an acid, the acid that dissolves lithium phosphate may be selected from hydrochloric acid (HCl), sulfuric acid ($H_2SO_4$), nitric acid ($HNO_3$), hydrofluoric acid (HF), hydrogen bromide (HBr), and a combination thereof.

In another embodiment of the present invention, in the step of preparing a monovalent ion selective-type electrodialysis device disposed in the order of a cathode cell containing a cathode separator; a monovalent anion selective-type dialysis membrane for selectively permeating a monovalent anion; a monovalent cation selective-type dialysis membrane for selectively permeating a monovalent cation; and an anode cell containing an anode separator; injecting the lithium phosphate dissolved in the acid between the anode separator of the anode cell and the monovalent cation selective-type dialysis membrane, and between the cathode separator of the cathode cell and the monovalent anion selective-type dialysis membrane, respectively, and injecting water between the monovalent cation selective-type dialysis membrane and the monovalent anion selective-type dialysis membrane, the cathode cell and the anode cell may include an electrode solution selected from lithium sulfate ($Li_2SO_4$), lithium hydroxide (LiOH), lithium dihydrogen phosphate ($LiH_2PO_4$), phosphoric acid ($H_3PO_4$), and a combination thereof, respectively.

Specifically, a concentration of the electrode solution may be 0.1 to 20 wt %.

In addition, electrical conductivity of the electrode solution may be 10 to 100 ms/cm.

The step of obtaining an aqueous lithium chloride solution, and at the same time, obtaining an aqueous phosphoric acid solution produced as a by-product, by applying an electric current to the monovalent ion selective-type electrodialysis device may include: permeating lithium ions in the lithium phosphate dissolved in the acid through the monovalent cation selective-type dialysis membrane to be transferred in a direction to the cathode; permeating the chlorine ion in the lithium phosphate dissolved in the acid through the monovalent anion selective-type dialysis membrane to be transferred in a direction to the anode; concentrating the transferred lithium ion and the transferred chlorine ion between the monovalent cation selective-type dialysis membrane and the monovalent anion selective-type dialysis membrane to provide the aqueous lithium chloride solution; and concentrating phosphate ion in the lithium phosphate dissolved in the acid remained between the anode separator of the anode cell and the monovalent cation selective-type dialysis membrane and the cathode separator of the cathode cell and the monovalent anion selective-type dialysis membrane to provide the aqueous phosphoric acid solution.

In the step of obtaining an aqueous lithium chloride solution, and at the same time, obtaining a phosphoric acid aqueous solution formed as a byproduct, by applying an electric current to the monovalent ion selective-type electrodialysis device, a concentration of the recovered aqueous phosphoric acid solution may be 0.1 to 3.0 M.

In the step of preparing a bipolar electrodialysis device disposed in the order of an anode cell containing an anode; a first bipolar membrane; an anion selective-type dialysis membrane; a cation selective-type dialysis membrane, a second bipolar membrane; and a cathode cell containing a cathode, injecting the aqueous lithium chloride solution between the cation selective-type dialysis membrane and the anion selective-type dialysis membrane, and injecting water between the first bipolar membrane and the anion selective-type dialysis membrane and between the second bipolar membrane and the cation selective-type dialysis membrane, respectively, a weight ratio of an injection amount of water relative to an injection amount of the aqueous lithium chloride solution (water:aqueous lithium chloride solution) may be 1:20 to 1:2.

Specifically, the step of obtaining an aqueous lithium hydroxide solution and at the same time, obtaining a aqueous hydrochloric acid solution formed as a byproduct by applying an electric current to the bipolar electrodialysis device may include: hydrolyzing the water in the first bipolar membrane and the second bipolar membrane to generate hydroxide ion and proton; permeating lithium ions in the aqueous lithium chloride solution through the cation selective-type dialysis membrane to be transferred in a direction to the cathode; concentrating the lithium ion generated in the second bipolar membrane and the transferred lithium ion between the cation selective-type dialysis membrane and the second bipolar membrane to provide an aqueous lithium hydroxide solution; permeating chlorine ion in the aqueous lithium chloride solution through the anion selective-type dialysis membrane to be transferred in a direction to the anode; and concentrating proton generated in the first bipolar membrane and the transferred chlorine ion between the anion selective-type dialysis membrane and the first bipolar membrane to provide an aqueous hydrochloric acid solution.

In the step of obtaining an aqueous lithium hydroxide solution and at the same time, obtaining an aqueous hydrochloric acid solution formed as a byproduct by applying an electric current to the bipolar electrodialysis device, a concentration of the separated aqueous hydrochloric acid solution may be 0.1 to 3.0 M.

The monovalent ion selective-type electrodialysis device may be one that the monovalent cation selective-type dialysis membrane and the monovalent anion selective-type dialysis membrane are paired into a pair, and a plurality of the dialysis membrane pairs is continuously formed.

The bipolar electrodialysis device may be one that a bipolar membrane; an anion selective-type dialysis membrane and a cation selective-type dialysis membrane are paired into a pair, and a plurality of the dialysis membrane pairs is continuously formed.

In another embodiment of the present invention, a method of manufacturing lithium carbonate includes a step of preparing the aqueous lithium hydroxide solution obtained by the method; and a step of carbonating the aqueous lithium hydroxide solution to obtain lithium carbonate.

On the other hand, the step of carbonating the aqueous lithium hydroxide solution to obtain lithium carbonate may be performed by a reaction of the aqueous lithium hydroxide solution with carbon dioxide ($CO_2$).

Yet another embodiment of the present invention provides an apparatus of manufacturing a lithium compound including a stacked electrodialysis device in which a pair of a first anion selective-type dialysis membrane selectively permeating monovalent anion and a first cation selective-type dialysis membrane selectively permeating monovalent cation is continuously disposed between a first cathode cell including a first cathode and a first cathode separator and a first anode cell including a first anode and a first anode separator, consisting of: an electrode solution supplying line supplying an electrode solution into the first cathode cell and the first anode cell; a lithium phosphate supplying line supplying lithium phosphate dissolved in an acid and a water supplying line supplying water which are alternatively disposed each between the pair of the first anion selective-type dialysis membrane and the first cation selective-type dialysis membrane; and an aqueous lithium chloride solution discharging line discharging the aqueous lithium chloride solution generated after performing the electrodialysis and an aqueous phosphoric acid solution discharging line discharging the aqueous phosphoric acid solution which are alternatively disposed each between the pair of the first anion selective-type dialysis membrane and the first cation selective-type dialysis membrane, so as to continuously convert the supplied lithium phosphate into the aqueous lithium chloride solution.

Further yet another embodiment of the present invention provides an apparatus of manufacturing a lithium compound further including a stacked bipolar electrodialysis device in which a pair of a third bipolar layer and a second anion selective-type dialysis membrane and a second cation selective-type dialysis membrane is continuously disposed between a second cathode cell including a second cathode and a second anode cell including a second anode, consisting of a second electrode solution supplying line supplying an electrode solution into the second cathode cell and the second anode cell; an aqueous lithium chloride solution supplying line supplying the aqueous lithium chloride solution discharged from the stacked electrodialysis device into between the second anion selective-type dialysis membrane and the second cation selective-type dialysis membrane; a second water supplying line supplying water into each of between the third bipolar layer and the second anion selective-type dialysis membrane and between the second cation selective-type dialysis membrane and the third bipolar layer; an aqueous lithium hydroxide solution discharging line discharging an aqueous lithium hydroxide solution generated after performing the bipolar electrodialysis and disposed between the second cation selective-type dialysis membrane and the third bipolar layer; an aqueous hydrochloric acid solution discharging line discharging an aqueous hydrochloric acid solution generated after performing the electrodialysis and disposed between the third bipolar layer and the second anion selective-type dialysis membrane: and a remaining aqueous lithium chloride solution discharging line discharging a remaining aqueous lithium chloride solution generated after performing the bipolar electrodialysis and disposed between the second anion selective-type dialysis membrane and the second cation selective-type dialysis membrane, so as to continuously convert the supplied aqueous lithium chloride solution into the aqueous lithium hydroxide solution.

The pair of the first anion selective-type dialysis membrane and the first cation selective-type dialysis membrane may be continuously disposed in tens to thousands pairs, and the pair of the third bipolar membrane and the second anion selective-type dialysis membrane and the second cation selective-type dialysis membrane may be continuously disposed in tens to thousands pairs.

The aqueous phosphoric acid solution discharged from the stacked electrodialysis device may be re-supplied for a phosphorus supplying material of the lithium phosphate manufacturing process.

The aqueous hydrochloric acid solution discharged from the stacked bipolar electrodialysis device may be re-supplied to a supplying part of the lithium phosphate dissolved in the acid.

It may further include a carbonation device converting the discharged aqueous lithium hydroxide solution into lithium carbonate.

Advantageous Effects

According to embodiments of the present invention, lithium hydroxide and lithium carbonate may be each obtained with a high purity and a high concentration with a high efficiency and a low process cost.

Specifically, when the lithium phosphate is dialyzed using the monovalent ion selective-type electrodialysis device, it may effectively separate the impurity of phosphoric acid, and at the same time, it may obtain an aqueous lithium chloride solution that lithium is concentrated in a high concentration. In addition, when the aqueous lithium chloride solution is dialyzed using the bipolar electrodialysis device, it may effectively separate the impurity of hydrochloric acid, and at the same time, it may obtain an aqueous lithium hydroxide solution that lithium is concentrated in a high concentration.

In addition, the separated phosphoric acid and hydrochloric acid according to embodiments of the present invention may be recycled by inputting each of them into the process of the present invention again, so it may economically produce lithium hydroxide and lithium carbonate.

Furthermore, it may finally obtain lithium hydroxide and lithium carbonate in a powder form from the aqueous lithium hydroxide solution.

MODE FOR INVENTION

Figure 1:
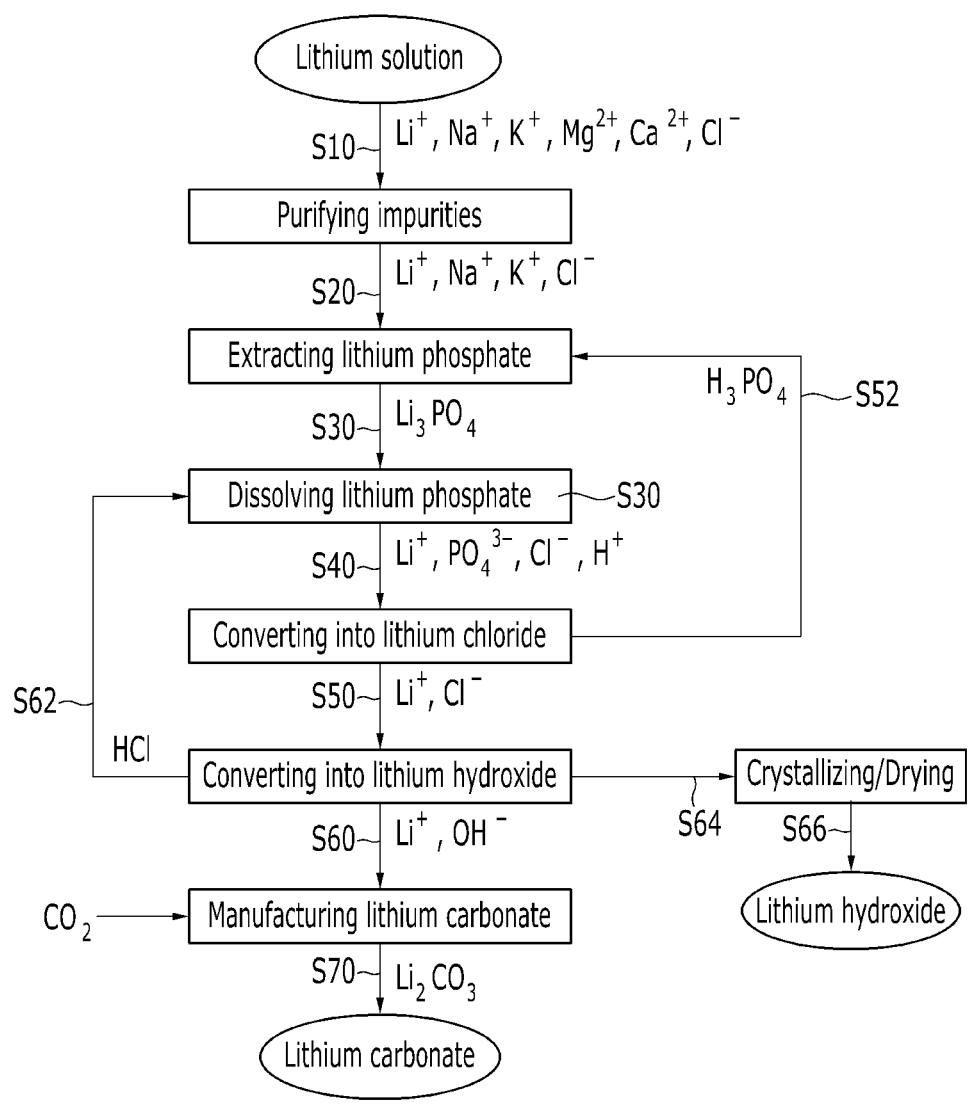
FIG. 1 is a flowchart collectively summarizing a method of manufacturing lithium hydroxide and lithium carbonate according to exemplary embodiments of the present invention.

Hereinafter, embodiments of the present invention are described in detail. However, these embodiments are exemplary, the present invention is not limited thereto and the present invention is defined by the scope of claims.

Unless otherwise defined, all terms (including technical and scientific terms) used herein have the same meaning as commonly understood by a person skilled in the art. Through the specification, unless explicitly described to the contrary, the word "comprise" and variations such as "comprises" or "comprising" will be understood to imply the inclusion of stated elements but not the exclusion of any other elements. Further, the singular forms are intended to include the plural forms as well, unless the context clearly indicates otherwise.

As mentioned in above, a chemical precipitation and a natural evaporation are inappropriate as an economical method of manufacturing a lithium hydroxide and a lithium carbonate having a high purity in greater than or equal to a predetermined concentration, so the method substituting the same is required.

The present Inventors suggest a series of processes including i) a step of converting lithium phosphate into lithium chloride, ii) a step of converting the lithium chloride into lithium hydroxide, and iii) a step of obtaining the lithium hydroxide by itself in a powder form or carbonating the lithium hydroxide to obtain a lithium carbonate, and they consider following matters in each step.

i) First, the step of converting lithium phosphate into lithium chloride corresponds to dissolving the lithium phosphate in an acid and injecting the same into a monovalent ion selective-type electrodialysis device together with water to separate an aqueous lithium chloride solution and an aqueous phosphoric acid solution.

Specifically, when the lithium phosphate is dissolved in the acid, the lithium chloride having a high concentration is produced by a chemical reaction and simultaneously, a phosphoric acid is produced as a by-product. When the product is added directly into the carbonation process, a lithium carbonate is produced by the carbonation of the lithium chloride, but simultaneously, a large amount of impurity generated by the phosphoric acid is inevitably produced. Meanwhile, the phosphoric acid is an expensive material and is also a material including phosphorus (P) which is an environmentally hazardous material.

Considering this, it should recover and recycle the phosphoric acid, separate from the lithium chloride while obtaining the lithium chloride that lithium is concentrated in a high concentration, which may be accomplished by the monovalent ion selective-type electrodialysis device.

ii) Meanwhile, a step of converting the lithium chloride into a lithium hydroxide corresponds to a step of injecting the separated aqueous lithium chloride solution into a bipolar electrodialysis device to separate an aqueous lithium hydroxide solution and an aqueous hydrochloric acid solution.

Specifically, in order to directly carbonate the separated aqueous lithium chloride solution, it may adjust pH around 11 by adding an additive such as caustic soda and the like. In this case, the obtained lithium carbonate inevitably includes a large amount of impurity produced by the additives, so an additional process such as a hot water cleaning and the like is unnecessarily, causing problems that a lithium yield is reduced, and the cost is increased.

Unlike this, the lithium hydroxide does not require to add an additive for increasing pH during the carbonation process, so it may provide a lithium carbonate with a high yield without the additional process. The bipolar electrodialysis device may effectively separate the lithium chloride from the by-product of hydrochloric acid while converting the same into a lithium hydroxide having a high concentration.

iii) In addition, the separated aqueous lithium hydroxide solution is suitable to be applied for an electrode material of a rechargeable battery or the like, by adding the same in a carbonation process to provide a lithium carbonate or by being provided in a powder form.

Overall, lithium is concentrated in a high concentration in the each process, and simultaneously, it is effectively separated from the inevitably generated by-product, so each of the material may be obtained with a high efficiency, and the by-product may be moved to an appropriate process and recycled, so it is economical.

The series of processes may be collectively summarized as in FIG. 1, so a method of manufacturing each material is described referring to the same.

First, a process of preparing lithium phosphate (S10-S20), which is a raw material for the process of manufacturing lithium chloride, is described.

The lithium phosphate may be obtained with a high purity by purifying divalent ion such as $Ca^{2+}$, $Mg^{2+}$ or the like in a lithium-containing solution (for example, a solution extracting lithium dissolved in ocean, a solution generated during a recycling process of a wasted lithium battery, a lithium mineral leaching solution, brine, lithium-containing hot spring water, lithium-containing underground water, lithium-containing bittern, etc.) and then adding a phosphorus supplying material.

The general components included in the lithium-containing solution may be $Li^+$, $Na^+$, $K^+$, $Ca^{2+}$, $Mg^{2+}$, $Cl^-$, $SO_4^{2-}$, and the like. However, the other components except the $Li^+$ may be referred to impurity in the process of manufacturing lithium chloride, lithium hydroxide, and lithium carbonate according to exemplary embodiments of the present invention, particularly, since the impurities may be also carbonated and precipitated together with the lithium carbonate during the process of manufacturing lithium carbonate, the impurities are required to be removed (S10).

Above the rest in the impurities, $Ca^{2+}$ and $Mg^{2+}$ may be precipitated on the surface of cation selective-type dialysis membrane in the later-described bipolar electrodialysis device, causing a membrane contamination, as well as they are difficult components to be removed even by hot water cleaning due to the low solubility, so they are needed to be first removed.

A method of removing the $Ca^{2+}$ and $Mg^{2+}$ is not particularly limited, but may be one using the following Reaction Scheme 1 to 3 or the like.

[Reaction Scheme 1]

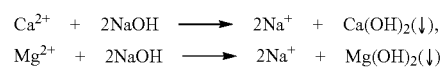

$Ca^{2+} + 2NaOH \longrightarrow 2Na^+ + Ca(OH)_2(\downarrow)$,
$Mg^{2+} + 2NaOH \longrightarrow 2Na^+ + Mg(OH)_2(\downarrow)$

[Reaction Scheme 2]

$Ca^{2+} + Na_2CO_3 \longrightarrow 2Na^+ + CaCO_3(\downarrow)$,
$Mg^{2+} + Na_2CO_3 \longrightarrow 2Na^+ + MgCO_3(\downarrow)$

[Reaction Scheme 3]

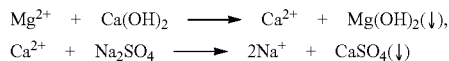

Considering Reaction Schemes 1 to 3, $Ca^{2+}$ and the $Mg^{2+}$ may be precipitated as $Ca(OH)_2$, $Mg(OH)_2$, $CaCO_2$, $MgCO_3$, $CaSO_4$, and the like by injecting NaOH, $Na_2CO_3$, $Ca(OH)_2$, $Na_2SO_4$, and the like sequentially and appropriately to the lithium-containing solution.

In the lithium-containing solution that the $Ca^{2+}$, $Mg^{2+}$ are selectively separated and removed, $Li^+$, $Na^+$, $K^+$, $Cl^-$ are remained. When a phosphorus supplying material is added thereto and followed by appropriately adjusting pH, a lithium phosphate may be obtained (S20).

Examples of the phosphorus supplying material may include phosphoric acid and the like. According to one embodiment of the present invention, in order to save a raw material cost and to prevent the environmental pollution, the aqueous phosphoric acid solution, which is a by-product generated during a process of converting lithium phosphate into lithium chloride, may be recycled to use the phosphorus supplying material.

Relating this, a description on a process of converting lithium phosphate to lithium chloride (S30-S40) is followed.

Figure 2:
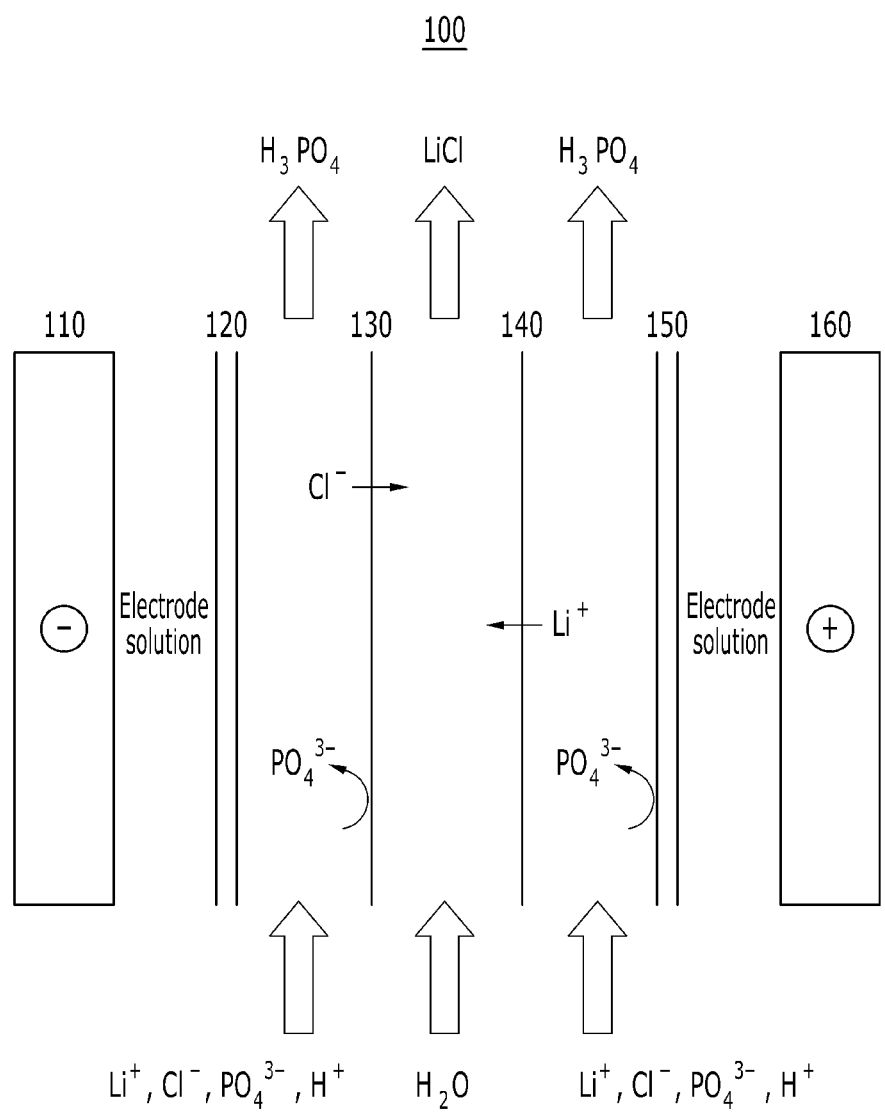
FIG. 2 schematically shows a method of manufacturing lithium chloride using a monovalent ion selective-type electrodialysis device according to one exemplary embodiment according to the present invention.

As described in above, in order to obtain lithium chloride that lithium is concentrated in a high concentration and also to recover and recycle the phosphoric acid (S52) besides the lithium chloride, it may employ a monovalent ion selective-type electrodialysis device that a monovalent cation selective-type dialysis membrane 140 and monovalent anion selective-type dialysis membrane 130, which are selectively permeating a monovalent cation and a monovalent anion, respectively, are disposed between an anode cell and a cathode cell. The anode cell includes an anode 160 and an anode separator 150, and the cathode cell includes a cathode 110 and a cathode separator 120, and an electrode solution is injected into between the anode 160 and the anode separator 150 and between the cathode 110 and the cathode separator 120. The monovalent ion selective-type electrodialysis device 100 is schematically shown in FIG. 2, so it is described with reference to this.

The lithium phosphate is dissolved in an acid and followed by injecting the same into each of between the anode separator 150 of the anode cell and the monovalent cation selective-type dialysis membrane 140 and between the cathode separator 120 of the cathode cell and the monovalent anion selective-type dialysis membrane 130, and injecting water into between the monovalent cation selective-type dialysis membrane 140 and the monovalent anion selective-type dialysis membrane 130 to prepare an electrodialysis.

Specifically, the electrode solution injected into the cathode cell and the anode cell respectively may include an electrode solution selected from lithium sulfate ($Li_2SO_4$), lithium hydroxide (LiOH), lithium dihydrogen phosphate ($LiH_2PO_4$), phosphoric acid ($H_3PO_4$), and a combination thereof. The electrode solution is circulated to smoothly transfer electron in each cell In this case, the electrode solution may have a concentration of 0.1 to 20 wt %. In addition, the electrode solution may have an electrical conductivity of 10 to 100 ms/cm. Specifically, the electrical conductivity of the electrode solution is proportional to the concentration of the electrode solution. Meanwhile, the terms "proportional to" do not mean only directly proportional to, but substantially means a trendy that the electrical conductivity is also increased as the concentration of the electrode solution is going to be increased.

Relating this, it is required to smoothly transfer ion in the monovalent ion selective-type electrodialysis device 100, and for this, it is required to provide each of the concentration of the electrode solution and the electrical conductivity with greater than or equal to a certain level.

However, when each of the concentration and the electrical conductivity of the electrode solution is excessively high, the ion transferring speed is instead delayed in the monovalent ion selective-type electrodialysis device 100, and the electrical resistance is occurred, causing an increase in voltage, a reduction of electric current, a reduction of current efficiency, an increase in power costs, and the like.

More specifically, when the concentration and the electrical conductivity of the electrode solution are each excessively high, the concentration difference from each solution (i.e., the lithium phosphate dissolved in an acid and the water) injected into the monovalent ion selective-type electrodialysis device may be risen, and the concentration difference causes a diffusion force, and the diffusing force is driven in an opposition direction to the originally desired direction of transferring ion.

Collectively considering the above, the concentration of the electrode solution is needed to be 0.1 to 20 wt %, and the electrical conductivity is needed to be 10 to 100 ms/cm.

A kind of the acid dissolving the lithium phosphate is not particularly limited, but may be selected from hydrochloric acid (HCl), sulfuric acid ($H_2SO_4$), nitric acid $HNO_3$, hydrofluoric acid (HF), hydrogen bromide (HBr), and a combination thereof, and hydrochloric acid (HCl) is more preferably. In one exemplary embodiment of the present invention, the aqueous hydrochloric acid solution which is produced as a by-product in the process of converting lithium chloride to lithium hydroxide (S50) is recycled (S62) to be used as the dissolving acid, which is described in later.

Meanwhile, when electricity is applied to a monovalent ion selective-type electrodialysis device 100 where the lithium phosphate dissolved in the acid and the water are being injected, anion is transferred toward the anode 160 by the electrophoresis effect, and cation is transferred toward the cathode 110.

Specifically, lithium phosphate and hydrochloric acid in the lithium phosphate dissolved in the acid are reacted as shown in the following Reaction Scheme 4, resultantly, the transferred ions according to the electrophoresis effect are $Li^+$, $Cl^-$, $PO_4^{3-}$, $H^+$ or the like.

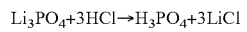 [Reaction Scheme 4]

In this case, only chlorine ion which is monovalent ion in the anions may be permeated through the monovalent anion selective-type dialysis membrane 130, but phosphate ion may be not permeated. In addition, lithium ion which is monovalent cation may be permeated through the monovalent cation selective-type dialysis membrane 140 in an opposite direction to the chlorine ion.

Thereby, the lithium ion is continuously concentrated together with the chlorine ion between the monovalent cation selective-type dialysis membrane 140 and the monovalent anion selective-type dialysis membrane 130 to provide an aqueous lithium chloride solution. Meanwhile, phosphate ion of the lithium phosphate dissolved in the acid which is remained between the anode separator 150 of the anode cell and the monovalent cation selective-type dialysis membrane 140 and between the cathode separator 120 of the cathode cell and the monovalent anion selective-type dialysis membrane 130 are concentrated to provide an aqueous phosphoric acid solution.

Thereby, the aqueous lithium chloride solution may be recovered between the monovalent cation selective-type dialysis membrane 140 and the monovalent anion selective-type dialysis membrane 130, and the aqueous phosphoric acid solution may be recovered from between the anode separator 150 of the anode cell and the monovalent cation selective-type dialysis membrane 140 and between the cathode separator 120 of the cathode cell and the monovalent anion selective-type dialysis membrane 130.

Resultantly, when the lithium phosphate is used as a raw material, and the monovalent ion selective-type electrodialysis device 100 is used, it may prepare an aqueous lithium chloride solution that lithium is concentrated in a high concentration, and it may be effectively separated from the aqueous phosphoric acid solution generated at the same time.

In this case, the concentration of the aqueous phosphoric acid solution may be 0.1 to 3.0 M. Specifically, in order that the aqueous phosphoric acid solution is recovered and recycled (S52), it is required to ensure that the concentration is greater than or equal to 0.1 M. On the other hand, when the aqueous phosphoric acid solution having a concentration of greater than 3.0 M is recycled, it generates a diffusion force due to the concentration difference, causing an increase in voltage, a reduction of current, a reduction of current efficiency, an increase in powder costs, so it is required to recover the aqueous phosphoric acid solution in less than or equal to 3.0 M.

In this case, the aqueous phosphoric acid solution may be recovered and recycles (S52) as a phosphorus supplying material for the process of preparing lithium phosphate, as mentioned above.

In addition, the aqueous lithium chloride solution separated from the aqueous phosphoric acid solution may be used as a raw material for being converted to the aqueous lithium hydroxide solution.

Meanwhile, the monovalent ion selective-type electrodialysis device 100 may be employed as a stacked one that a plurality of the same are sequentially stacked.

When the monovalent ion selective-type electrodialysis device 100 is made in a stacked one as in above, it may have a structure that the monovalent cation selective-type dialysis membrane 140 and monovalent anion selective-type dialysis membrane 130 are paired, and several ten to several thousand pairs thereof are disposed between the anode cell and the cathode cell.

When using the stacked electrodialysis device, it may include supplying lines connecting each of lithium phosphate dissolved in an acid and water to be supplied for the stack and discharging lines connecting each of an aqueous lithium chloride solution and an aqueous phosphoric acid solution to be discharged from the stack. More detailed stacked electrodialysis device will be described in later.

Next, a process of transferring the lithium chloride into lithium hydroxide (S50) is described.

Figure 3:
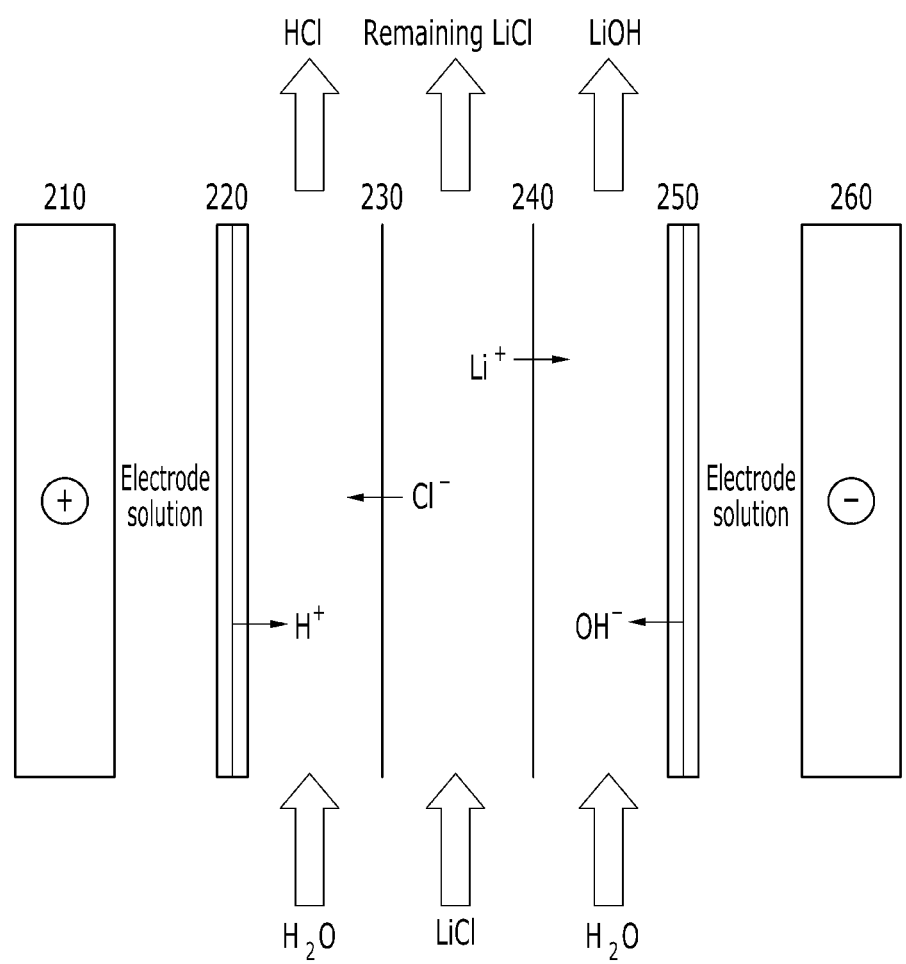
FIG. 3 schematically shows a method of manufacturing lithium hydroxide using a bipolar electrodialysis device according to one exemplary embodiment according to the present invention.

A bipolar electrodialysis device 200 used for converting the lithium chloride into lithium hydroxide may be one that, as shown in FIG. 3, an anode cell including an anode 210, a first bipolar membrane 220, an anion selective-type dialysis membrane 230, a cation selective-type dialysis membrane 240, a second bipolar membrane 250, a cathode cell including a cathode 260 are sequentially disposed.

For the bipolar electrodialysis device 200, the aqueous lithium chloride solution is injected between the anion selective-type dialysis membrane 230 and the cation selective-type dialysis membrane 240, water is injected to each of between the first bipolar membrane 220 and the anion selective-type dialysis membrane 230 and between the second bipolar membrane 250 and the cation selective-type dialysis membrane 240 to prepare the bipolar electrodialysis.

When electricity is applied to the bipolar electrodialysis device to be injected with the aqueous lithium chloride solution and the water, the concentrate of water is hydrolyzed in each bipolar membrane, and cation and anion in the aqueous lithium chloride solution are transferred toward the cathode 260 and the anode 210, respectively, by the electrophoresis effect.

In this case, a weight ratio of an injection amount of water relative to an injection amount of the aqueous lithium chloride solution (water:aqueous lithium chloride solution) may be controlled at 1:20 to 1:2. Specifically, the injected water amount refers to the water amount injected into each of between the first bipolar membrane 220 and the anion selective-type dialysis membrane 230 and between the second bipolar membrane 250 and the cation selective-type dialysis membrane 240.

When the injected water amount is small amount of below the range, a concentration of the obtained aqueous lithium chloride solution is excessively increased, and a diffusion force is generated by the concentration difference, so causing that voltage is increased, current is reduced, current efficiency is decreased, power cost is increased, and the like.

Unlike this, when the water injected amount is excessive amount of over the range, a concentration of the obtained aqueous lithium chloride solution is excessively low, so additional concentrating process is required for providing lithium hydroxide and lithium carbonate using the same, and thereby an energy cost is occurred.

Pure water including no impurity is preferable as the water used in the example embodiment of the present invention, and the pure water includes distilled water, and ion-exchanged water is more preferable.

Hydroxide ion generated in the second bipolar membrane 250 and the transferred lithium ion are concentrated between the cation selective-type dialysis membrane 240 and the second bipolar membrane 250 to provide an aqueous lithium hydroxide solution. In addition, proton generated in the first bipolar membrane 220 and the transferred chlorine ion are concentrated between the anion selective-type dialysis membrane 230 and the first bipolar membrane 220 to provide an aqueous hydrochloric acid solution.

Thereby, the aqueous lithium hydroxide solution may be recovered between the second bipolar membrane 250 and the cation selective-type dialysis membrane 240, and the aqueous hydrochloric acid solution may be recovered between the first bipolar membrane 220 and the anion selective-type dialysis membrane 230.

Resultantly, when the aqueous lithium chloride solution is used as a raw material, and the bipolar electrodialysis device 200 is used, it may obtain an aqueous lithium hydroxide solution that lithium is concentrated in a high concentration, and simultaneously, it may effectively separated from the aqueous hydrochloric acid solution generated at the same time. The chemical reaction at this time is collectively shown as the following Reaction Scheme 5.

$$LiCl+H_2O \rightarrow LiOH+HCl \quad \text{[Reaction Scheme 5]}$$

It is already mentioned that the aqueous hydrochloric acid solution may be used as a part or a whole of the acid of the step (S62) of dissolving the lithium phosphate in an acid.

Furthermore, the aqueous lithium hydroxide solution may be used as a raw material for preparing a lithium carbonate or may be recovered in a powder phase (S60-S70) through a crystallizing process and a drying process.

Specifically, the lithium carbonate may be easily prepared by spraying carbon dioxide to the aqueous lithium hydroxide solution. Meanwhile, the powder phase of lithium hydroxide may be obtained by concentrating the aqueous lithium hydroxide solution according to the vacuum evaporation and crystallizing the same (S64-S66) and then drying the same by a steam drier.

Figure 5:
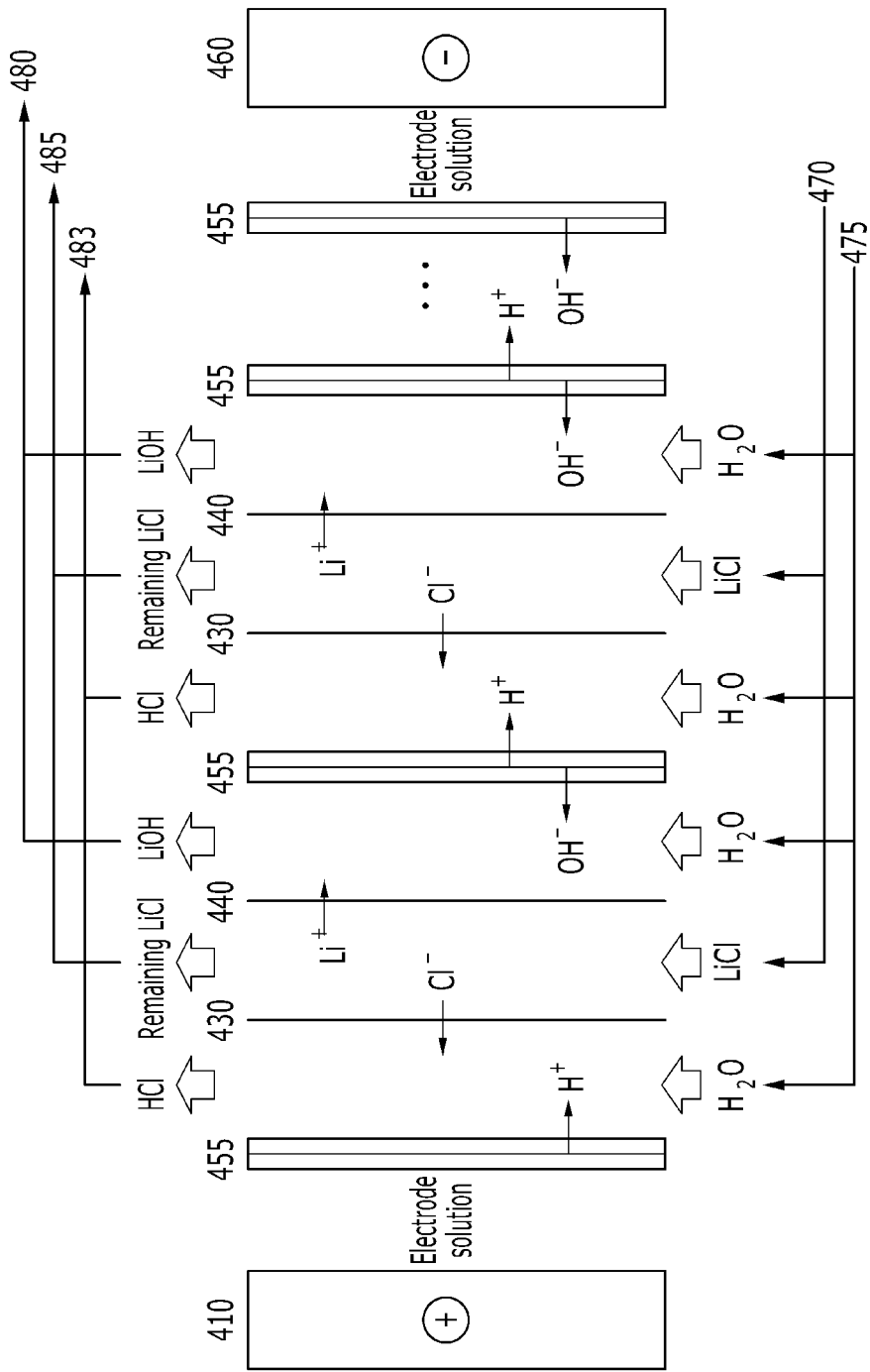
FIG. 5 schematically shows a method of preparing lithium hydroxide using a stacked bipolar electrodialysis device according to one exemplary embodiment according to the present invention.

Meanwhile, the bipolar electrodialysis device may be employed in a stack that a plurality thereof are sequentially stacked, as shown in FIG. 5.

When the bipolar electrodialysis device is structured in a stacked one, it may have a structure that a third bipolar membrane 455 and an anion selective-type dialysis membrane 430 and a cation selective-type dialysis membrane 440 are paired between the two third bipolar layer 455, and the several tens to several hundreds of the pairs are disposed between the anode cell and the cathode cell.

When using the stacked bipolar electrodialysis device, it may be provided with supplying lines connecting each of aqueous lithium chloride solution and water which are supplied to the stack and discharging lines connecting each of the aqueous lithium hydroxide solution and the aqueous hydrochloric acid solution which are discharged from the stack.

Hereinafter, a stacked electrodialysis device and a stacked bipolar electrodialysis device according to further another exemplary embodiment of the present invention are detailed described with reference to FIGS. 4 and 5.

Figure 4:
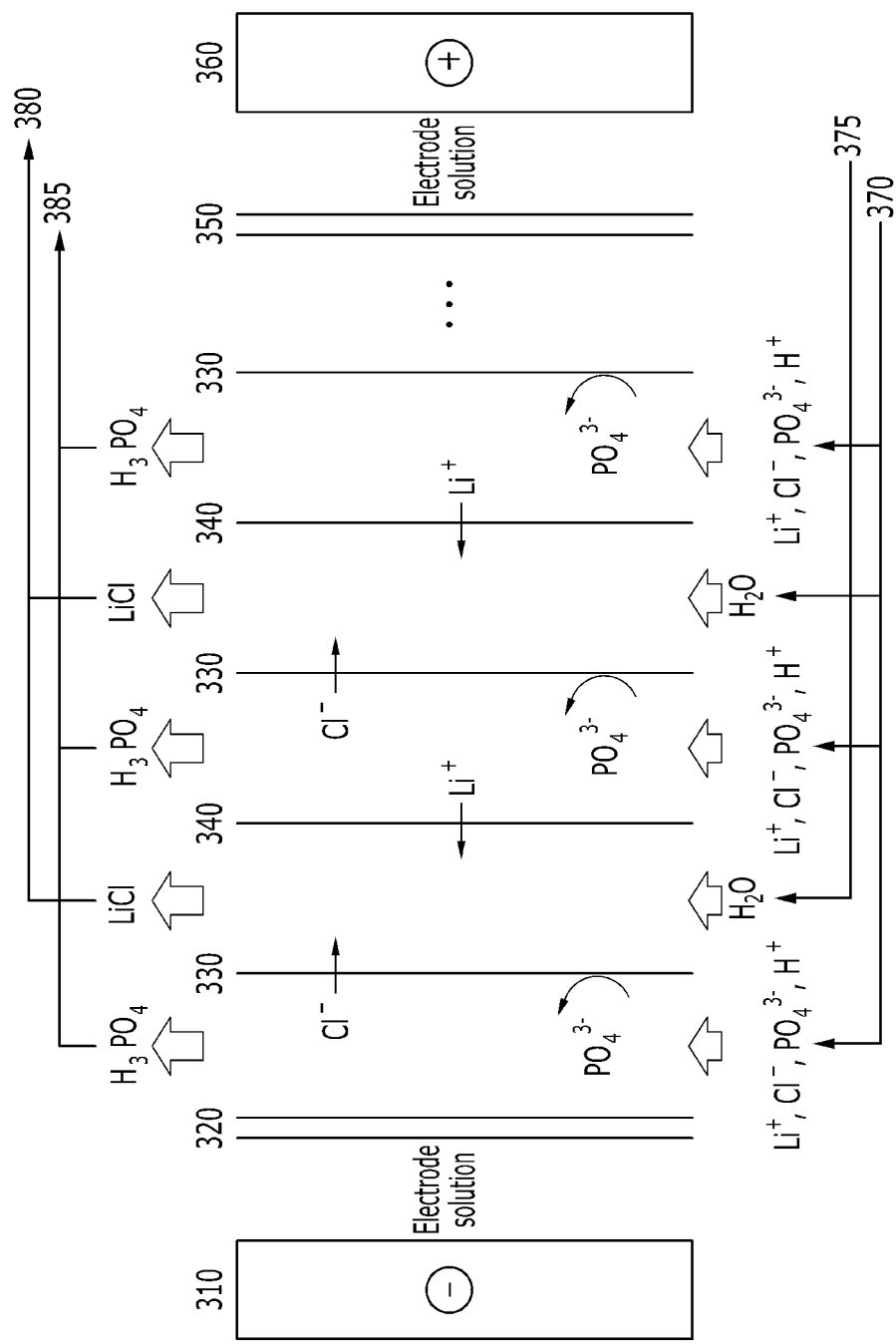
FIG. 4 schematically shows a method of manufacturing lithium chloride using a stacked monovalent ion selective-type electrodialysis device according to one exemplary embodiment according to the present invention.

First, as shown in FIG. 4, in the stacked electrodialysis device, a first anion selective-type dialysis membrane 330 selectively permeating a monovalent anion and a first cation selective-type dialysis membrane 340 selectively permeating a monovalent cation are paired, and continuously disposed between a first cathode cell including a first cathode 310 and a first cathode separator 320 and a first anode cell including a first anode 360 and a first anode separator 350. The pair of the selective-type dialysis membrane 330 and 340 may be continuously disposed in several ten to several thousand pairs.

Further, electrode solution supplying lines (not shown) supplying an electrode solution to the first cathode cell and the first anode cell are each formed on and below the stacked electrodialysis device in a closed shape to circulate the electrode solution to the stacked electrodialysis device, and a predetermined region of the electrode solution supplying line is interposed and connected to an electrode solution supplying tank (not shown) capable of refilling the electrode solution and a control valve (not shown). In addition, a motor (not shown) capable of circulating the electrode solution may be mounted in the electrode solution supplying tank. In this case, the used electrode solution may be selected from lithium sulfate ($Li_2SO_4$), lithium hydroxide (LiOH), lithium dihydrogen phosphate ($LiH_2PO_4$), phosphoric acid ($H_3PO_4$), and a combination thereof.

Meanwhile, in the stacked electrodialysis device, a lithium phosphate supplying line 370 and a water supplying line 375 supplying lithium phosphate dissolved in an acid and water, respectively, may be alternatively disposed each of between a pair of the first anion selective-type dialysis membrane 330 and the first cation selective-type dialysis membrane 340. In addition, for discharging the aqueous lithium chloride solution and the aqueous phosphoric acid solution generated after performing the electrodialysis to the outside of the stacked electrodialysis device, an aqueous lithium chloride solution discharging line 380 and an aqueous phosphoric acid solution discharging line 385 are alternatively disposed each between the pair of the first anion selective-type dialysis membrane 330 and the first cation selective-type dialysis membrane 340.

When electricity is applied to the mentioned stacked electrodialysis device with continuously supplying lithium phosphate dissolved in an acid and water in a separated state from each other through the lithium phosphate supplying line 370 and the water supplying line 375, the aqueous lithium chloride solution and the aqueous phosphoric acid solution which are generated by the electrophoresis effect are continuously discharged in a separated state from each other through the aqueous lithium chloride solution discharging line 380 and the aqueous phosphoric acid solution discharging line 385, respectively.

The aqueous lithium chloride solution obtained from the stacked electrodialysis device as above may be supplied to the bipolar electrodialysis device which will be described later, and the separated and recovered aqueous phosphoric acid solution may be re-supplied as a phosphorus supplying material for a process of preparing lithium phosphate (S52).

Hereinafter, a stacked bipolar electrodialysis device is described.

As shown in FIG. 5, in a stacked bipolar electrodialysis device, a third bipolar membrane 455 and a second anion selective-type dialysis membrane 430 and a second cation selective-type dialysis membrane 440 are paired, and continuously disposed between a second anode cell including a second anode 410 and a second cathode cell including a second cathode 460. The pair of the bipolar membrane and the selective-type dialysis membranes may be continuously disposed in several ten to several thousand pairs.

Furthermore, a second electrode solution supplying lines (not shown) supplying a second electrode solution to the second cathode cell and the second anode cell are formed on and below the stacked bipolar electrodialysis device in a closed shape to circulate the second electrode solution to the stacked bipolar electrodialysis device, and a predetermined part of the second electrode solution supplying line is interposed and connected to a second electrode solution supplying tank (not shown) capable of refilling the second electrode solution and a second control valve (not shown). In addition, a second motor (not shown) capable of circulating the second electrode solution may be mounted in the second electrode solution supplying tank. In this case, the used second electrode solution may be selected from any one of lithium hydroxide (LiOH) and potassium chloride (KCl) or a combination thereof.

Meanwhile, in the stacked bipolar electrodialysis device, a lithium chloride supplying line 470 and a second water supplying line 475 supplying lithium phosphate dissolved in an acid and water, respectively, may be displaced. In this case, the aqueous lithium chloride solution supplying line 470 may have an inlet between the second anion selective-type dialysis membrane 430 and the second cation selective-type dialysis membrane 440, and the second water supplying line 475 may have an inlet in each of between the third bipolar membrane 455 and the second anion selective-type dialysis membrane 430 and between the second cation selective-type dialysis membrane 440 and the third bipolar membrane 455.

In addition, for discharging the aqueous lithium hydroxide solution and the aqueous hydrochloric acid solution and the remaining aqueous lithium chloride solution, which are generated after performing the bipolar electrodialysis, to the outside of the stacked bipolar electrodialysis device, an aqueous lithium hydroxide solution discharging line 480 and an aqueous hydrochloric acid solution discharging line 483 and a remaining aqueous lithium chloride solution discharging line 485 may be formed in the stacked bipolar electrodialysis device. In this case, the aqueous lithium hydroxide solution discharging line 480 may have an outlet between the second cation selective-type dialysis membrane 440 and the third bipolar membrane 455, and the aqueous hydrochloric acid solution discharging line 483 may have an outlet between the third bipolar membrane 455 and the second anion selective-type dialysis membrane 430, and the remaining aqueous lithium chloride solution discharging line 485 may have an outlet between the second anion selective-type dialysis membrane 430 and the second cation selective-type dialysis membrane 440.

When electricity is applied to the mentioned stacked bipolar electrodialysis device with continuously supplying aqueous lithium chloride solution and water through the aqueous lithium chloride supplying line 470 and the second water supplying line 475, the aqueous lithium hydroxide solution and the aqueous hydrochloric acid solution and the remaining aqueous lithium chloride solution, which are generated by the electrophoresis effect, are continuously discharged in a separated state through the aqueous lithium hydroxide solution discharging line 480 and the aqueous hydrochloric acid solution discharging line 483 and the remaining aqueous lithium chloride solution discharging line 485, respectively.

The aqueous lithium hydroxide solution obtained from the stacked bipolar electrodialysis device may be recovered in a powder phase through a crystallizing process and a drying process, or may be used as a raw material for preparing lithium carbonate. In addition, the aqueous hydrochloric acid solution obtained from the stacked bipolar electrodialysis device may be used as a part of or a whole of the acid in "the step of dissolving lithium phosphate in an acid."

Furthermore, a part or a whole of the remaining aqueous lithium chloride solution discharged from the stacked bipolar electrodialysis device may be recycled to the aqueous lithium chloride solution supplying line 470.

The mentioned stacked electrodialysis device and the mentioned stacked bipolar electrodialysis device may be continuously mounted to provide an apparatus of manufacturing a lithium compound. When using the apparatus of manufacturing a lithium compound, the process of converting lithium phosphate into an aqueous lithium chloride solution by the stacked electrodialysis device and the process of converting the converted aqueous lithium chloride solution into an aqueous lithium hydroxide solution by the stacked bipolar electrodialysis device may be continuously performed.

The apparatus of manufacturing a lithium compound may further include a carbonation device converting the aqueous lithium hydroxide solution obtained from the stacked bipolar electrodialysis device into lithium carbonate.

Although the embodiments of the present invention are collectively described with references to FIGS. 1 to 5, each of embodiments of the present invention may be separately performed or other specific modification may be performed.

Hereinafter, preferable examples of the present invention are described. However, the examples are preferable examples of the present invention and the present invention is not limited by the examples.

Example 1: Manufacture of Lithium Hydroxide (1) Manufacture of Lithium Chloride

A reagent grade lithium phosphate (Japan Pure Chemical Co., Ltd.) was used as a raw material, and the monovalent ion selective-type electrodialysis device shown in FIG. 2 was used to prepared a lithium chloride.

Specifically, 1 M lithium phosphate was dissolved in 3 M hydrochloric acid to provide total 1 L of a solution, and 0.5 L of water was prepared, and then an electric current is applied while inputting the same into a monovalent ion selective-type electrodialysis device and, as shown in FIG. 2.

In this case, in the monovalent ion selective-type electrodialysis device, an aqueous phosphoric acid solution having a concentration of 0.5 mol was used as an electrode solution, and an electric current of 2.2 A was applied at a voltage of 12V for 140 minutes.

As the result, it may recover a concentrated aqueous lithium chloride solution between a monovalent cation selective-type dialysis membrane and a monovalent anion selective-type dialysis membrane of the monovalent ion selective-type electrodialysis device and also recover an aqueous phosphoric acid solution separated therefrom.

Theoretically, in the solution that the lithium phosphate was dissolved in hydrochloric acid, 1M phosphoric acid and 3M lithium chloride may be generated according to the following Reaction Scheme 4:

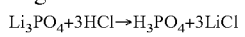

$$Li_3PO_4 + 3HCl \rightarrow H_3PO_4 + 3LiCl \qquad \text{[Reaction Scheme 4]}$$

Actually, the recovered aqueous lithium chloride solution was measured to have a lithium concentration of 18 g/L and a phosphor concentration of 4.4 g/L. In addition, the recovered aqueous phosphoric acid solution was measured to have a phosphor concentration of 47.3 g/L and a lithium concentration of 4.0 g/L.

Thereby, it is understood that 83.5% of lithium in the raw material of lithium phosphate was converted to lithium chloride.

Meanwhile, the remaining phosphoric acid in the aqueous lithium chloride solution may be precipitated to lithium phosphate during the converting process to the aqueous lithium hydroxide solution, so it may be recovered during the process. In addition, as the remaining lithium was present in the aqueous phosphoric acid solution, the aqueous phosphoric acid solution may be used as a raw material for extracting lithium phosphate.

(2) Manufacture of Lithium Hydroxide

The recovered aqueous lithium chloride solution was used as a raw material, and a bipolar electrodialysis device shown in FIG. 3 was used to prepare a lithium hydroxide.

Specifically, 1 L of the aqueous lithium chloride solution having a the lithium concentration of 18 g/L and 0.5 L of water were used, and a bipolar electrodialysis device was applied with an electric current of 4.4 A at a voltage of 30V for 140 minutes while inputting the same, as shown in FIG. 3.

As the result, it may recover an aqueous hydrochloric acid solution between an anion selective-type dialysis membrane and a first bipolar membrane of the bipolar electrodialysis device and also recover an aqueous lithium hydroxide solution between a cation selective-type dialysis membrane and a second bipolar membrane.

In this case, it was measured that a lithium concentration of the recovered aqueous lithium hydroxide solution was 18.9 g/L, so it is confirmed that the lithium conversion rate was 93%.

Example 2: Manufacture of Lithium Carbonate

Using the aqueous lithium hydroxide solution recovered from Example 1 as a raw material, a lithium carbonate was prepared according to a carbonation reaction.

Specifically, the aqueous lithium hydroxide solution having a lithium concentration of 18.9 g/L and 60 g of carbon dioxide were each placed in separated nozzles, and then they were simultaneously sprayed to induce a carbonation reaction, so as to obtain a lithium carbonate.

It was measured that a lithium concentration in the recovered aqueous lithium hydroxide solution was 2.84 g/, and it is understood that 85% of lithium in the aqueous lithium hydroxide solution was converted to lithium carbonate.

Meanwhile, a filtrate of the carbonation reaction may be recycled as a desalted solution of the bipolar electrodialysis device.

The present invention is not limited by the example embodiments and may be performed in various forms, and those skilled in the art will be able to understand that the present invention can be implemented in other detailed forms without changing the technical spirit or an essential characteristic. Therefore, the aforementioned embodiments should be understood to be exemplary but not limiting the present invention in any way.

The invention claimed is:

1. A method for manufacturing lithium hydroxide, comprising
    a step of dissolving lithium phosphate in a hydrochloric acid;
    a step of preparing a monovalent ion selective-type electrodialysis device disposed in the order of a cathode cell containing a cathode separator, a monovalent anion selective-type dialysis membrane for selectively permeating a monovalent anion, a monovalent cation selective-type dialysis membrane for selectively permeating a monovalent cation, and an anode cell containing an anode separator;
    a step of injecting the lithium phosphate dissolved in the hydrochloric acid between the anode separator of the anode cell and the monovalent cation selective-type dialysis membrane, and between the cathode separator of the cathode cell and the monovalent anion selective-type dialysis membrane, respectively;
    a step of injecting water between the monovalent cation selective-type dialysis membrane and the monovalent anion selective-type dialysis membrane;
    a step of obtaining an aqueous lithium chloride solution, and at the same time, obtaining a phosphoric acid aqueous solution formed as a byproduct, by applying an electric current to the monovalent ion selective-type electrodialysis device; and
    a step of converting the obtained aqueous lithium chloride solution into an aqueous lithium hydroxide solution.

2. The method for manufacturing lithium hydroxide of claim 1, wherein the step of converting the obtained aqueous lithium chloride solution into an aqueous lithium hydroxide solution includes
    a step of preparing a bipolar electrodialysis device disposed in the order of an anode cell containing an anode; a first bipolar membrane; an anion selective-type dialysis membrane; a cation selective-type dialysis membrane, a second bipolar membrane; and a cathode cell containing a cathode;
    a step of injecting the aqueous lithium chloride solution between the cation selective-type dialysis membrane and the anion selective-type dialysis membrane;
    a step of injecting water between the first bipolar membrane and the anion selective-type dialysis membrane and between the second bipolar membrane and the cation selective-type dialysis membrane, respectively; and
    a step of obtaining an aqueous lithium hydroxide solution and at the same time, obtaining an aqueous hydrochloric acid solution formed as a byproduct by applying an electric current to the bipolar electrodialysis device.

3. The method for manufacturing lithium hydroxide of claim 2, wherein the lithium phosphate is prepared by a method including: a step of preparing a lithium-containing solution; and
    a step of injecting a solution comprising phosphoric acid to the lithium-containing solution to precipitate a dissolved lithium as lithium phosphate.

4. The method for manufacturing lithium hydroxide of claim 3, wherein the aqueous phosphoric acid solution obtained by the monovalent ion selective-type electrodialysis device is used as the solution comprising phosphoric acid in the step of injecting a solution comprising phosphoric acid to the lithium-containing solution to precipitate a dissolved lithium as lithium phosphate.

5. The method for manufacturing lithium hydroxide of claim 4, wherein the aqueous hydrochloric acid solution obtained by the bipolar electrodialysis device is used as a part of or a whole of the hydrochloric acid in the step of dissolving lithium phosphate in a hydrochloric acid.

6. The method for manufacturing lithium hydroxide of claim 3, wherein after the step of obtaining an aqueous lithium hydroxide solution and at the same time, obtaining a aqueous hydrochloric acid solution formed as a byproduct by applying an electric current to the bipolar electrodialysis device,
    the method further includes a step of concentrating the aqueous lithium hydroxide solution to crystallize it; and
    a step of drying the crystallized lithium hydroxide to obtain lithium hydroxide in a powder form.

7. The method for manufacturing lithium hydroxide of claim 6, wherein in the step of preparing a lithium-containing solution,
    the lithium-containing solution is selected from a solution extracting lithium dissolved in the ocean, a solution generated in a process of recycling a wasted lithium battery, a lithium mineral-leaching solution, a brine, a lithium-containing hot spring water, a lithium-containing underground water, a lithium-containing bittern, and a combination thereof.

8. The method for manufacturing lithium hydroxide of claim 7, wherein before the step of injecting a solution comprising phosphoric acid to the lithium-containing solution to precipitate dissolved lithium as lithium phosphate,
    the method further includes a step of removing a divalent ion impurity in the lithium-containing solution.

9. The method for manufacturing lithium hydroxide of claim 8, wherein the step of removing a divalent ion impurity in the lithium-containing solution includes
    a step of removing a calcium ion and a magnesium ion by injecting a compound selected from sodium hydroxide (NaOH), sodium carbonate ($Na_2CO_3$), calcium hydroxide ($Ca(OH)_2$), sodium sulfate ($Na_2SO_4$), and a combination thereof to the lithium-containing solution.

10. The method for manufacturing lithium hydroxide of claim 2, wherein in the step of preparing a monovalent ion selective-type electrodialysis device disposed in the order of a cathode cell containing a cathode separator, a monovalent anion selective-type dialysis membrane for selectively permeating a monovalent anion, a monovalent cation selective-type dialysis membrane for selectively permeating a monovalent cation, and an anode cell containing an anode separator, injecting the lithium phosphate dissolved in the acid between the anode separator of the anode cell and the monovalent cation selective-type dialysis membrane, and between the cathode separator of the cathode cell and the monovalent anion selective-type dialysis membrane, respectively, and injecting water between the monovalent cation selective-type dialysis membrane and the monovalent anion selective-type dialysis membrane, the cathode cell and the anode cell include an electrode solution selected from lithium sulfate ($Li_2SO_4$), lithium hydroxide (LiOH), lithium dihydrogen phosphate ($LiH_2PO_4$), phosphoric acid ($H_3PO_4$), and a combination thereof, respectively.

11. The method for manufacturing lithium hydroxide of claim 10, wherein electrical conductivity of the electrode solution is 10 to 100 ms/cm.

12. The method for manufacturing lithium hydroxide of claim 2, wherein the step of obtaining an aqueous lithium chloride solution, and at the same time, obtaining a phosphoric acid aqueous solution formed as a byproduct, by applying an electric current to the monovalent ion selective-type electrodialysis device comprises:

a step of permeating lithium ions in the lithium phosphate dissolved in the acid through the monovalent cation selective-type dialysis membrane to be transferred in a direction to the cathode; and a step of permeating the chlorine ion in the lithium phosphate dissolved in the acid through the monovalent anion selective-type dialysis membrane to be transferred in a direction to the anode, wherein the transferred lithium ion and the transferred chlorine ion are gathered between the monovalent cation selective-type dialysis membrane and the monovalent anion selective-type dialysis membrane to provide the aqueous lithium chloride solution, and phosphate ion in the lithium phosphate dissolved in the acid remaining behind is gathered between the anode separator of the anode cell and the monovalent cation selective-type dialysis membrane and between the cathode separator of the cathode cell and the monovalent anion selective-type dialysis membrane to provide the aqueous phosphoric acid solution.

13. The method for manufacturing lithium hydroxide of claim 12, wherein in the step of obtaining an aqueous lithium chloride solution, and at the same time, obtaining a phosphoric acid aqueous solution formed as a byproduct, by applying an electric current to the monovalent ion selective-type electrodialysis device, a concentration of the obtained aqueous phosphoric acid solution is 0.1 to 3.0 M.

14. The method for manufacturing lithium hydroxide of claim 2, wherein, in the step of preparing a bipolar electrodialysis device disposed in the order of an anode cell containing an anode; a first bipolar membrane; an anion selective-type dialysis membrane; a cation selective-type dialysis membrane, a second bipolar membrane; and a cathode cell containing a cathode; the step of injecting the aqueous lithium chloride solution between the cation selective-type dialysis membrane and the anion selective-type dialysis membrane, and the step of injecting water between the first bipolar membrane and the anion selective-type dialysis membrane and between the second bipolar membrane and the cation selective-type dialysis membrane, respectively, a weight ratio of an injection amount of water relative to an injection amount of the aqueous lithium chloride solution is 1:20 to 1:2.

15. The method for manufacturing lithium hydroxide of claim 14, wherein the step of obtaining an aqueous lithium hydroxide solution and at the same time, obtaining an aqueous hydrochloric acid solution formed as a byproduct by applying an electric current to the bipolar electrodialysis device comprises:

a step of hydrolyzing the water in the first bipolar membrane and the second bipolar membrane to generate hydroxide ion and proton;

a step of permeating lithium ions in the aqueous lithium chloride solution through the cation selective-type dialysis membrane to be transferred in a direction to the cathode, wherein the hydroxide ion generated in the second bipolar membrane and the transferred lithium ion are gathered between the cation selective-type dialysis membrane and the second bipolar membrane to provide an aqueous lithium hydroxide solution; and a step of permeating chlorine ion in the aqueous lithium chloride solution ion through the anion selective-type dialysis membrane to be transferred in a direction to the anode, wherein the proton generated in the first bipolar membrane and the transferred chlorine ion are gathered between the anion selective-type dialysis membrane and the first bipolar membrane to provide an aqueous hydrochloric acid solution.

16. The method for manufacturing lithium hydroxide of claim 15, wherein in the step of obtaining an aqueous lithium hydroxide solution and at the same time, obtaining an aqueous hydrochloric acid solution formed as a byproduct by applying an electric current to the bipolar electrodialysis device, a concentration of the separated aqueous hydrochloric acid solution is 0.1 to 3.0 M.

17. The method for manufacturing lithium hydroxide of claim 2, wherein the monovalent ion selective-type electrodialysis device is one that the monovalent cation selective-type dialysis membrane and the monovalent anion selective-type dialysis membrane are paired, and a plurality of the dialysis membrane pairs are continuously formed.

18. The method for manufacturing lithium hydroxide of claim 17, wherein the bipolar electrodialysis device comprises:

a plurality of a dialysis membrane pairs; and a plurality of the bipolar membranes, wherein each of the plurality of the dialysis membrane pairs consists of the anion selective-type dialysis membrane and the cation selective-type dialysis membrane and is disposed between two adjacent bipolar membranes.

19. A method of manufacturing lithium carbonate, further comprising a step of preparing the aqueous lithium hydroxide solution obtained by the method of claim 2; and a step of carbonating the aqueous lithium hydroxide solution to obtain lithium carbonate.

20. The method of manufacturing lithium carbonate of claim 19, wherein the step of carbonating the aqueous lithium hydroxide solution to obtain lithium carbonate is performed by a reaction of the aqueous lithium hydroxide solution with carbon dioxide ($CO_2$).

* * * * *